Dec. 1, 1959   J. C. VULMIERE ET AL   2,915,665
ELECTRIC DISCHARGE TUBES

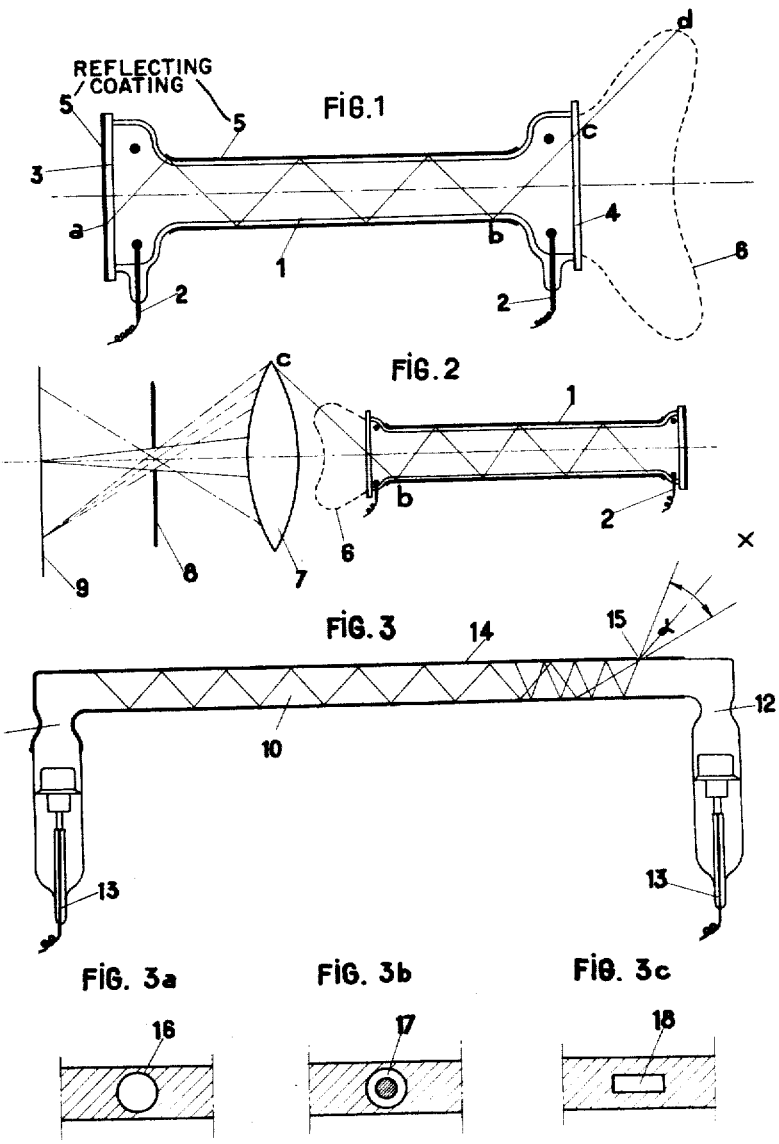

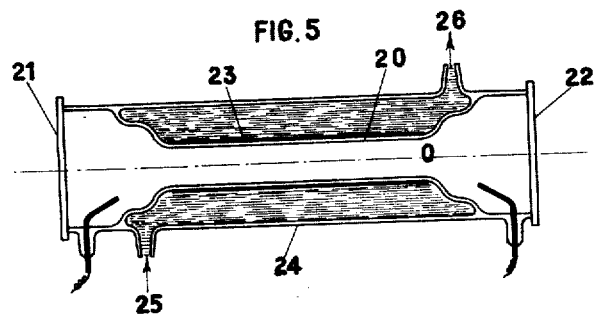
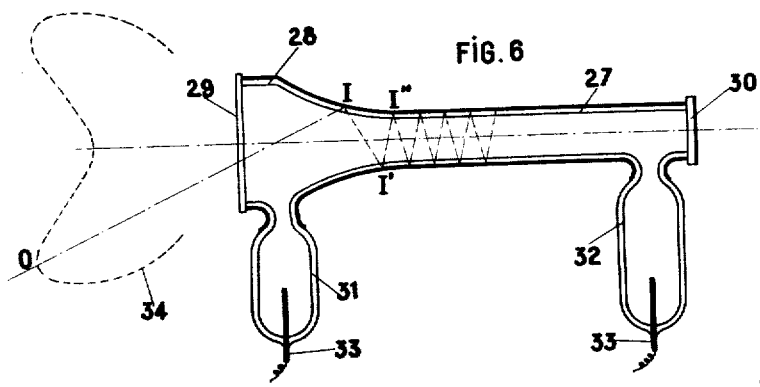
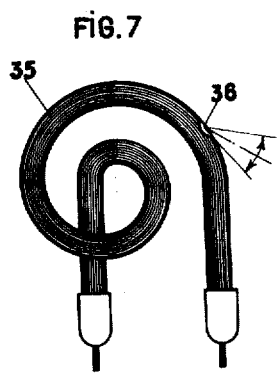
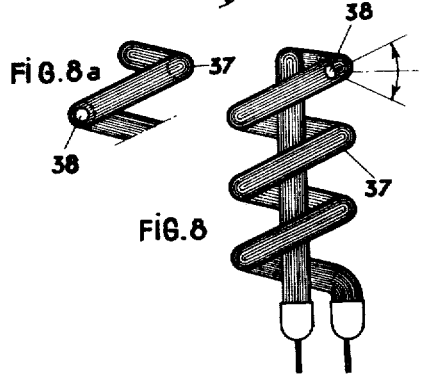
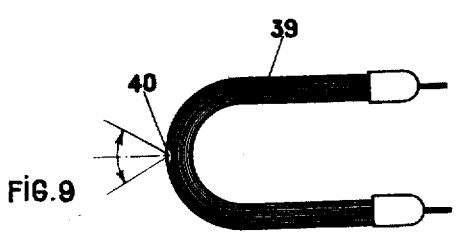

Filed July 3, 1957   3 Sheets-Sheet 3

INVENTORS
JACQUES CLAUDE VULMIERE
HUGUETTE VULMIERE née
GRANGAUD
BY Pollard, Johnston
Smythe & Robinson
ATTORNEYS :::::: {.columns}
United States Patent Office 2,915,665
Patented Dec. 1, 1959

2,915,665
ELECTRIC DISCHARGE TUBES

Jacques Claude Vulmiere and Huguette Vulmiere, née Grangaud, Pre-Saint-Gervais, France, assignors to Centre National de la Recherche Scientifique, Paris, France, a public establishment of France Application July 3, 1957, Serial No. 669,780

Claims priority, application France July 5, 1956

6 Claims. (Cl. 313—113)

The present invention relates to gas-filled luminous electric discharge tubes.

When it is desired to use such a tube as a source of light in various optical instruments, there is a major interest in providing both a high brilliance and a sufficiently large angular aperture of the effective light beam, which aperture should sometimes reach a considerable value.

Whether such tubes are fed by means of a high A.C. voltage or by means of a condenser discharge, the increase of brilliance is presently obtained by using a tube comprising a gas column of great length and by arranging the said tube in such a manner that said column is observed endwise along the longitudinal axis of the column, since the brilliance observed depends on the thickness of the gas layer through which the light passes. However, the effective angular aperture having a high and uniform brilliance then has a very low value. If, on the contrary, the tube is arranged in such a manner that it is observed perpendicularly to the longitudinal axis of the luminous gas column, the effective angular aperture increases but the brilliance is small because the thickness of the luminescent gas layer observed is small.

It may thus be said that in a given direction of observation and as long as no self-absorption occurs, the brilliance increases with the thickness of the observed gas layer, and that for a given diameter of the gaseous column in the tube, the effective angular aperture of the light beam decreases when the length of said column increases.

One object of the present invention is to provide gas filled discharge tubes in which both the brilliance and the angular aperture of the effective light beam are increased with respect to normal tubes, such an increase being obtained by simple and economical means which apply whatever the shape of the tube may be (rectilinear, U-shaped, spiral, helical tubes, etc.).

Another object is to provide gas-filled discharge tubes of high brilliance and emitting an effective light beam having a high angular aperture, which may be combined with another light source in order to provide a light beam even in the absence of discharge in the discharge tube.

Still another object is to provide such tubes in which the spectral composition of the emitted light may be modified at will.

Further objects will appear from the description which follows.

According to the invention, a gas filled discharge tube is coated with an inwardly reflecting metal coating, except for a relatively small transparent area provided on one of the walls of said tube. The radiations emitted by the gas in the tube issue from said tube through the said transparent area as a beam the brilliance and effective angular aperture of which are considerably increased due to multiple reflections at the metal coating of the tube, which reflections lead to an increase of the path of the light rays through the gas within the tube.

The place and contour of the said transparent area are selected according to the desired size of the luminous source and value of the effective angular aperture of the light beam. The said transparent area may for example be of circular, annular, or slot shape.

The tube may have any convenient shape and the particular type thereof should be selected according to the bulk admissible for the particular use under consideration.

The coating of the tube may be carried out by any convenient method, for example by known methods of silver or aluminum coating. The transparent area may be obtained by reserving the corresponding surface of the transparent wall of the tube when applying the metal coating or by local elimination of said coating.

According to another feature of the invention, the metal-coated, gas-filled discharge tube may be provided with a second transparent area and one or more secondary independent light sources may be arranged in connection with the tube, in such a manner that the light beam or beams issuing from said secondary sources are directed into the tube through the said second transparent area and issue from the tube through the first above mentioned transparent area after a plurality of reflections at the metal coating. With such a combination of a gas-filled discharge tube and of an independent light source, the first above mentioned transparent area may be made luminous even in the absence of discharge in the tube and it is thus possible to provide a single optical unit by means of which a given object or part of an object may be illuminated for observation and for photographic purposes, successively. It is also possible thereby to modify at will, by a convenient choice of the secondary, independent light source or sources, the spectral composition of the light emitted through the first transparent area of the tube by combining with the principal light source formed by the said tube, one or more convenient, independent, secondary light sources having a discontinuous or continuous spectrum. It is thus possible to alter the color of the emitted light or to obtain a known spectrum reference.

Various embodiments of the invention are described hereinafter, reference being had to the appended drawings, in which:

Fig. 1 is a diagrammatic, longitudinal, sectional view of a metalized gas-filled discharge tube according to the invention, showing the path of a light ray.

Fig. 2 is a similar view showing the combination of the tube with an optical system for the uniform illumination of an object which is to be observed through an optical instrument.

Fig. 3 is a diagrammatic, longitudinal, sectional view of a practical embodiment of a tube according to the invention.

Figs. 3a, 3b and 3c show different possible shapes of transparent windows in such a tube.

Fig. 4 is a side elevational view of another embodiment of the invention.

Fig. 5 is a longitudinal, sectional view of a high-power tube provided with a water cooling system.

Fig. 6 is a similar view of a gas-filled tube the brilliance indicatrix of which shows a maximum at the edge of the illumination field.

Figs. 7, 8, 8a and 9 are side elevational views of tubes of various shapes.

Figure 10:
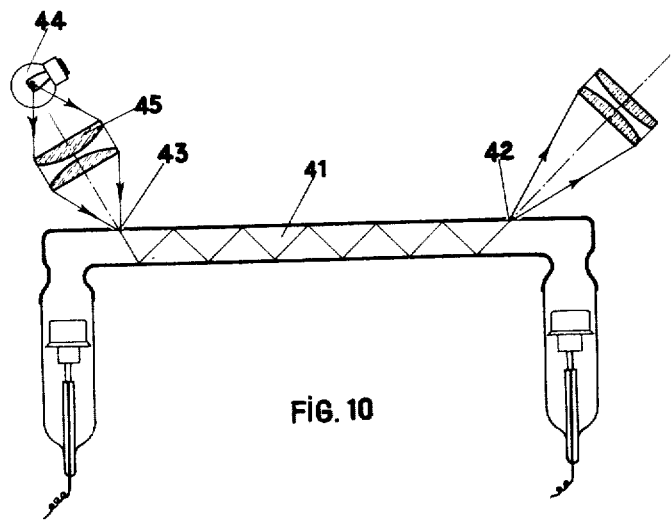
Fig. 10 is a longitudinal, sectional view of a rectilinear tube combined with an auxiliary source of light and an optical system providing an emission of light through the transparent area of the tube in the absence of discharge in said tube.

The diagram of Fig. 1 is intended to show how the brilliance and effective angular aperture of the light beam issuing from a gas tube may be simultaneously increased according to the invention. Referring to said figure 1 are the glass side walls of a gas tube having end portions of slightly increased diameter in which are located electrodes 2. The tube is closed at each end by transparent glass plates 3 and 4. A metal coating, e.g. a silver coating, is formed by any known means on side walls 1 and on end plate 3 of the tube. When observing the tube endwise, from the side of end plate 4, the brilliance of the observed beam will be the higher, the greater the length of the gas column through which pass the light beams.

For a non coated tube observed along the longitudinal axis thereof, the said length would correspond to that of the tube between the electrodes 2. For an observation along a line diverging from the above mentioned axis (e.g. along line dcb) the said length would rapidly decrease with an increasing angle between the same and the said axis, until it would reach a very small value, substantially equal to the diameter of the tube.

With metal-coated walls 1 and 3 according to the invention, multiple reflections take place at the metal coating 5, and considering for instance the path abcd as shown, the said reflections result in an increase of the length of the effective luminous path and therefore of the brilliance in the considered direction bcd. It should be noted that, due to the fact that the light rays pass through the glass walls of the tube at each of their reflection points, the tube heats more than a normal tube. Dotted line 6 shows the diffusion indicatrix for the considered tube. If the absorption by the walls of the tube is negligible and the reflection factor of the metal coating is high, the brilliance along line bcd may be higher than that along the longitudinal axis of the tube. One can thus obtain a flattened diffusion indicatrix which makes it possible to achieve a uniform illumination of an object which is to be observed, e.g. through an optical instrument, as shown in Fig. 2. In the example of Fig. 2, tube 1 is combined with an optical system comprising a lens 7 and a diaphragm 8 which lies approximately in the conjugate plane of the outlet window of the tube. Surface 9 is substantially uniformly illuminated, since the decrease of the apparent area of a source viewed otherwise than axially is compensated due to the relative increase of brilliance obtained at the edges of the radiation field.

Tube 10 of Fig. 3 is a conventional rectilinear tube of simple but bulky construction. Said tube comprises bent ends 11 and 12 in which electrodes 13 are located. A metal coating 14 is laid upon end 11 and the whole cylindrical rectilinear part of tube 10. The light source proper is formed by a window 15 provided on the tube by local elimination of the metal coating. Window 15 may assume any appropriate shape, e.g. circular as shown at 16 in Fig. 3a, annular as shown at 17 in Fig. 3b, or that of a slot 18 as in Fig. 3c. The direction of observation O—x is determined by the angular aperture α of the light beam which is necessary to cover the optical system on which said beam is to be directed. In case said angular aperture α is small, the observation can be made in a direction which is closer to a perpendicular on the longitudinal axis of the tube, which leads to a greater number of reflections at the metal coating and therefore to a higher brilliance. If window 15 is of very small size, it is possible to locate said window toward the middle of the tube, as shown at 19 in Fig. 4 and to make the observation perpendicularly on the longitudinal axis of the tube without undesirable decrease of the brilliance in said direction.

Fig. 5 relates to the case of a high-power gas tube. The gas tube proper comprises a cylindrical part 20 extending in two widely flaring end portions which are closed by end walls 21 and 22, respectively. The cylindrical part 20 of the tube is provided with an outer metal-coating 23 and is surrounded by a concentric cylindrical envelope 24. The space between tube 20 and envelope 24 forms a water-jacket provided with an inlet 25 and an outlet 26 for circulation of cooling water avoiding any excessive heating of the tube. The tube is observed endwise, the light source proper being formed by region O near the end of the cylindrical part 20.

Fig. 6 shows a tube 27 of generally cylindrical shape extending at the observed end in a widely flaring portion 28. The two ends of the tube are closed by end plates 29 and 30, respectively, and the tube is provided with two laterally extending bulbs 31 and 32 in which electrodes 33 are located. The lateral walls and the end plate 30 of the tube are metal-coated. The brilliance indicatrix of said tube, corresponding to dotted line 34, shows a maximum at the edges of the field, which results from the fact that when considering the light path OII'1" shown at Fig. 6, it may be seen that the light ray OI, due to the flaring shape of the end portion of the tube, is reflected along line II' in a direction which is closer to a perpendicular on the longitudinal axis of the tube, which leads to a longer path through the luminescent gas than for a direction of observation the angle of which with respect to said axis would be more acute.

When it is desired to provide gas tubes according to the invention of relatively small bulk, use should be made of non-rectilinear tubes such as those shown at Figs. 7, 8, 8a and 9. The tube 35 (Fig. 7) has a spiral shape and a transparent window 36 of circular shape as shown at 38 in Fig. 8a which represents a fraction of said tube 37 as seen in the direction of observation. Tube 39 (Fig. 9) is U-shaped and a transparent window 40 is provided in the middle part of the tube, at the end of the U-bend. The location of the various non-metallized areas or windows as shown at Figs. 7 through 9 are represented by way of example only, and the said locations are generally selected according to the desired light source and angular aperture of the effective beam which it is desired to obtain.

Tubes according to the invention may be employed for numerous uses, as it is often necessary in the optical field to have at one's disposal a light source having both a high brilliance and a wide angular aperture of the effective light beam. According to the case, tubes of various shapes and sizes, such as those above described may be used.

A light source formed from a tube according to the invention may be used for the illumination of a monochromator. Considering the very wide angular aperture of the light beam, it will then be possible to cast an enlarged image of the source on the entrance slit of the monochromator while retaining a wide aperture on the slit side. A high brilliance, a long slit and a wide aperture of the beam are thus obtained and it is possible to operate transmission measurements at the ends of the visible spectrum and in the near ultra-violet or infra-red for high optical densities.

The present invention may also be applied to metal vapour tubes such as high or low pressure potassium, cadmium or thallium tubes and the like. The metal-coating of the tube bulb increases the brilliance of the tube while decreasing the cooling. The luminous integration which results from the multiple reflections has the advantage of decreasing the brilliance variations, thus procuring a more stable source. Such sources are particularly useful in the field of spectroscopy.

The sources according to the invention are particularly interesting for the illumination of goniometers, interferometers, for studying rapid phenomena such as ballistic phenomena, in high- or low-power microscopes, due to the very wide geometrical extent of their issuing light beam.

They can also be applied as sources for slit-lamps and refractometers used in ophthalmology, where the low diffusion power of the ocular media and the microscopical observation of the details thereof require very brilliant light sources.

In the case of their application to retinographs, the increase of the brilliance makes it possible to use a smaller pupil than that presently used, therefore avoiding the necessity of dilating the pupil with the help of drugs. The said increase also makes possible relief retinography with two very small observation pupils.

Another important application of the present invention consists in combining the tubes according to the invention with optical systems in such a manner that the observation of objects and the production of photographic reproductions thereof may be easily obtained by means of a single illumination unit.

In a general manner, and more particularly in endoscopy or in the above mentioned applications, it is absolutely necessary, before releasing an electronic flash for taking a photographic document, to have at one's disposal a continuous but not necessarily powerful illumination, making it possible to control visually the aspect of the field which is to be photographed.

Up to now, use was made of a "flash" tube with electrical means capable of producing low power discharges at very small time intervals in the tube. In order to avoid flickering, the frequency of the said discharges should be at least of 24 flashes per second which entails a complicated and costly electrical system.

According to the present invention, use is made of a metal-coated tube as above described, in combination with means for rendering luminous the transparent area thereof in the absence of discharge within the tube.

Fig. 10 shows a rectilinear, metal-coated gas tube 41, similar to tube 10 of Fig. 3. Said tube comprises a transparent, non-metalized window 42 at one end, and in addition, a second transparent window 43 at the other end. The light issuing from a small electric bulb 44 is concentrated on window 43 by means of a convenient optical system such as a condenser 45. The location and size of window 43, as well as the angle of incidence of the light beam issuing from bulb 44 and optical system 45 are selected in order that the best luminous field may be obtained at the issue through window 42. The said window may thus be rendered luminous in the absence of flash in tube 41, with a wide field and a luminous flux which may be very high if desired. When applied as an illumination device for, say, an endoscope or like optical instrument provided with a photographic apparatus, the source of light formed by window 42 illuminated by the secondary source 44 makes it possible to observe first of all the area which is to be photographed. Once the observation has been satisfactorily carried out, a discharge is released in tube 41 for taking the desired photograph.

Figure 11:
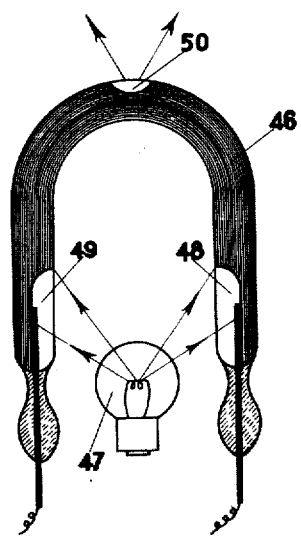
Fig. 11 is a side elevational view of a U-shaped tube combined with an auxiliary source of light for the same purpose as in Fig. 10.

In the particular embodiment shown at Fig. 11, the gas tube 46 is U-shaped and the incandescent bulb 47 is located between the branches of the U. Two transparent areas 48 and 49 are provided inwardly at the electrode bearing ends of the tube for allowing the penetration into the tube of as large as possible a number of light rays from bulb 47. The transparent window 50 from which the illumination beam finally issues is located in the middle part of the U bend.

Among the various applications of the devices described with reference to Figs. 10 and 11, medico-surgical photography should be more particularly cited.

When it is desired to illuminate intensively irregular and shiny mucous membranes such as are encountered e.g. in colposcopy and in surgery, a light source of wide extent produces a great number of undesirable, brilliant reflections. On the contrary, a light source obtained according to the invention, which is both more brilliant and of smaller area than any of the sources used hitherto, makes it possible to obtain an illumination adapted for photographic purposes and to reduce to a minimum the undesirable reflections on the mucous membranes.

What we claim is:

1. A gas-filled illuminating device comprising an envelope containing a luminous gas, electric discharge means for exciting said gas to form light rays in said envelope, means enclosing substantially all the space within said envelope for reflecting light rays formed therein back into said envelope and repeatedly through said gas therein, and at least one relatively small window communicating with the interior of said envelope, said window being positioned to pass from said envelope a beam of rays containing rays passed repeatedly through said gas.

2. A gas-filled illuminating device comprising an envelope containing a luminous gas, electric discharge means for exciting said gas to form light rays in said envelope, means enclosing substantially all the space within said envelope for reflecting light rays formed therein back into said envelope and repeatedly through said gas therein, said last-named means including a reflecting coating applied to the surface of said envelope, and at least one relatively small window in the form of a portion of said surface free of said coating, said window being positioned to pass from said envelope a beam of rays containing rays passed repeatedly through said gas.

3. A gas-filled illuminating device as claimed in claim 2, said window being so located in said envelope that the beam passes through said window at an angle oblique to the longitudinal axis of the envelope.

4. A gas-filled illuminating device comprising an envelope containing a luminous gas, means enclosing substantially all the space within said envelope for reflecting light rays therein back into said envelope and repeatedly through said gas therein, relatively small first and second windows respectively communicating with the interior of said envelope to pass beams of light rays into and out of said envelope, and a light source exterior of said envelope positioned so that light rays therefrom will enter said envelope through said first window pass repeatedly through said gas within said envelope by reflections from said reflecting means and pass from said envelope through said second window.

5. A gas-filled illuminating device comprising an envelope containing a luminous gas, electric discharge means for exciting said gas to form light rays in said envelope, a reflecting coating applied to substantially all the outer surface of said envelope for reflecting light rays back into said envelope and repeatedly through said gas therein, relatively small first and second windows in the form of portions of said surface free of said coating and communicating with the interior of said envelope for allowing the passage of light rays therethrough, and a light source exterior of said envelope positioned so that light rays therefrom will enter said envelope through said first window and a beam comprising light rays formed in said envelope by reflection of rays from said exterior source will pass from said envelope through said second window.

6. An electric luminous discharge lamp comprising an envelope having transparent walls, a luminous gas filling said envelope, a continuous inwardly reflecting metal coating covering said walls with the exception of a relatively small area, thereby providing a transparent window, and a cooling water-jacket surrounding at least part of said tube while leaving said transparent window uncovered.

References Cited in the file of this patent

UNITED STATES PATENTS

| 1,190,071 | Adams | July 4, 1916 |
| 2,265,362 | Elenbaas | Dec. 9, 1941 |
| 2,544,261 | Gibson | Mar. 6, 1951 |